United States Patent
Domke et al.

(10) Patent No.: US 8,863,033 B2
(45) Date of Patent: Oct. 14, 2014

(54) METHOD AND SYSTEM FOR INSPECTING AN ASSET

(75) Inventors: Michael Christopher Domke, Skaneateles, NY (US); Nora Ellen Coombs, Syracuse, NY (US); Melissa Rose Stancato, Syracuse, NY (US)

(73) Assignee: General Electric Company, Schenectady, NY (US)

( * ) Notice: Subject to any disclaimer, the term of this patent is extended or adjusted under 35 U.S.C. 154(b) by 375 days.

(21) Appl. No.: 13/305,174

(22) Filed: Nov. 28, 2011

(65) Prior Publication Data

US 2013/0139112 A1 May 30, 2013

(51) Int. Cl.
*G06F 3/14* (2006.01)

(52) U.S. Cl.
USPC ............. 715/841; 715/708; 715/830; 725/81; 710/6; 345/173

(58) Field of Classification Search
CPC .................................... G06F 3/14; G06F 3/17
USPC .......... 715/200–277, 700–867; 700/701–866; 709/201–229; 705/50–79; 345/30–111; 345/173; 710/16; 725/81
See application file for complete search history.

(56) References Cited

U.S. PATENT DOCUMENTS

| | | |
|---|---|---|
| 2007/0169155 A1* | 7/2007 | Pasquale et al. ................ 725/81 |
| 2007/0225931 A1 | 9/2007 | Morse et al. |
| 2007/0226258 A1 | 9/2007 | Lambdin et al. |
| 2008/0155475 A1* | 6/2008 | Duhig ........................... 715/830 |
| 2010/0070925 A1* | 3/2010 | Einaudi et al. ................ 715/830 |
| 2010/0097057 A1 | 4/2010 | Karpen |
| 2011/0167176 A1* | 7/2011 | Yew et al. ......................... 710/6 |
| 2011/0175826 A1* | 7/2011 | Moore et al. .................. 345/173 |
| 2011/0258544 A1* | 10/2011 | Dinh-Trong et al. ......... 715/708 |

* cited by examiner

*Primary Examiner* — Ruay Ho
(74) *Attorney, Agent, or Firm* — Hiscock & Barclay LLP

(57) ABSTRACT

This disclosure describes embodiments of systems and methods for performing inspections of an asset. The systems can include an inspection apparatus that executes a menu directed inspection (MDI) protocol to direct an inspector that performs the inspection. The MDI protocol includes, in one example, reference material that is associated with areas of the asset that the inspector will inspect. This reference material can include data and information (e.g., technical manuals, operating manuals, images, etc.). In one embodiment, the method includes one or more steps for building an inspection tree with inspection points that correspond to the inspection areas on the asset. The method can also comprise steps for assigning or associating the reference material to inspection points, which is then available to the inspector on the inspection apparatus during execution of the MDI protocol.

20 Claims, 6 Drawing Sheets

METHOD AND SYSTEM FOR INSPECTING AN ASSET

BACKGROUND OF THE INVENTION

The subject matter disclosed herein relates to inspections and inspection systems for inspecting an asset and, more particularly, to embodiments of systems and methods for developing and implementing menu directed inspection (MDI) protocols.

Industrial inspection devices, such as borescopes, can collect data and information about the inspection areas on the asset, e.g., the interior of a turbine engine. These devices can have a screen that can display the information including images of the inspection area. User interfaces that facilitate operation of the inspection device are also shown on this screen. The interfaces can provide menu options that, among other things, can allow an end user (e.g., an inspector) to select files that implement the MDI protocols.

Often during the inspection, the inspector may wish to review information that is pertinent to the MDI protocol, the inspection area, and/or the asset. This information is often found in technical manuals, specifications, operating manuals, and like documents that describe aspects of the asset. It is unlikely, unfortunately, that these documents are readily available to the inspector. Rather, the inspector must manage and view these documents, whether in hard copy or electronic format (e.g., .pdf), as well as other data from multiple locations, many of which are remote from the location of the inspector and/or the asset.

The discussion above is merely provided for general background information and is not intended to be used as an aid in determining the scope of the claimed subject matter.

BRIEF DESCRIPTION OF THE INVENTION

This disclosure describes exemplary systems and methods, wherein the inspection systems include an inspection apparatus that an inspector can use to inspect an asset. An advantage that practice of some disclosed embodiments of the systems and methods realize is to provide ready access to reference material that are associated with the asset, with certain inspection points or areas that are inspected on the asset, as well as with the equipment used for the inspection (e.g., optical tips, apparatus diameter and length, etc.).

In one embodiment, the disclosure describes an inspection system with a inspection apparatus. The inspection apparatus comprises a display, a processor, memory coupled to the processor, and one or more executable instructions stored on the memory. The executable instructions are configured to be executed by the processor to generate an interface on the display. The executable instructions include instructions for displaying the interface in a first configuration having a menu from which a data file can be selected. The executable instructions also include instructions for displaying the interface in a second configuration in response to selection of the data file, the second configuration having a listing of reference files assigned to one or more inspection points of a menu directed inspection protocol. The instructions further include instructions for displaying the interface in a third configuration in response to selection of a reference file, the third configuration including a document component on which information corresponding to the reference file is displayed.

In another embodiment, the disclosure describes a method for executing a menu directed inspection of an asset. The method comprise steps for building an inspection tree comprising an inspection point corresponding to a location on the asset. The method also comprises steps for assigning reference material to the inspection point and for generating a data file comprising the inspection tree and the reference material. The method further includes steps for deploying the data file on an inspection apparatus that an inspector uses to perform the inspection of the asset.

In yet another embodiment, the disclosure describes an inspection apparatus that comprises a processor and memory coupled to the processor. The inspection apparatus can also comprise one or more executable instructions stored in the memory and configured to be executed by the processor to generate an interface on a display. The executable instructions include instructions for changing the interface between a variety of configurations, which include a first configuration having a menu from which a data file can be selected and a second configuration in response to selection of the data file, the second configuration having a listing of reference files assigned to one or more inspection points of a menu directed inspection protocol. The configuration can also include a third configuration in response to selection of a reference file, the third configuration including a document component on which information corresponding to the reference file is displayed.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
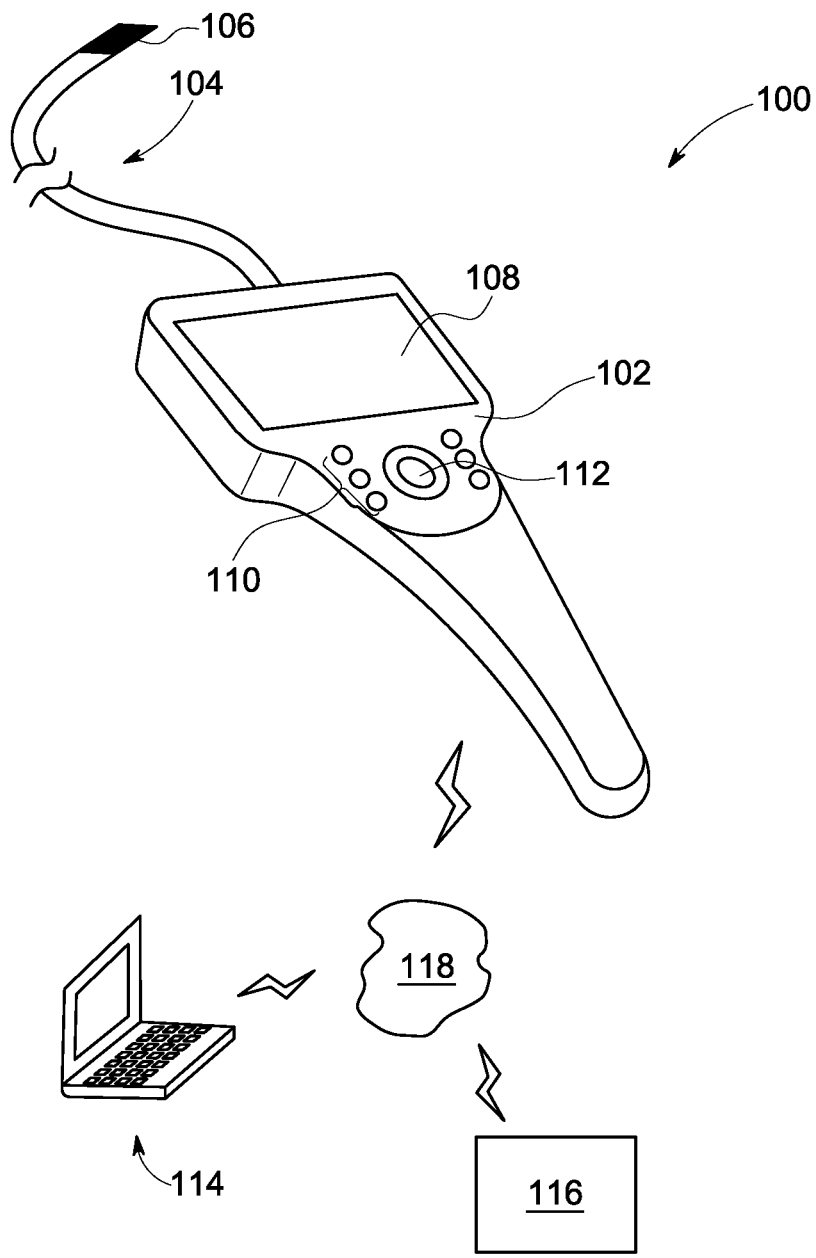
FIG. 1 depicts an exemplary inspection system for inspecting an asset.

The discussion below describes embodiments of methods and apparatus that improve techniques for inspecting an asset (e.g., a turbine). These embodiments make reference materials (e.g., manuals, service bulletins, technical instructions and manuals, image files, etc.) readily available to an inspector that performs inspection tasks as part a broader preventative inspection protocol. For example, the inspector may employ an inspection apparatus (e.g., a video borescope) that can store and run software and other executable instructions that guide the inspector through these inspection tasks. The inspection device may have a display, on which the software presents the inspector with a listing or graphical representation of areas on the asset the inspector is to inspect. This listing may indicate where in the asset the inspector is to direct a remote inspection module having a camera or other device that captures images from inside the asset. In one embodiment, the methods consolidate information about the inspection areas (as well as, in one example, about the asset and/or the inspection protocol) that would normally reside in multiple locations onto the inspection apparatus. This feature alleviates the need for the inspector to deviate from the tasks of the inspection protocol, e.g., to retrieve the information from one or more of these multiple locations.

In one aspect, the software comprises one or more instructions that embody a menu directed inspection (MDI) protocol for the performance of the inspection tasks. The MDI protocol can provide various screens and/or prompts on the display of the inspection device that guide the inspector through the inspection of the asset. These screens can indicate the name and location of the inspection area, identify the type of inspection data (e.g., images) the inspector is to collect, and provide information (e.g., location information) about the inspection area for the inspector to view. The screens may allow the inspector to enter text and/or other information pertinent to observations the inspector makes, e.g., on a fillable form the inspector can access on the display. In addition to these items, the screens may also allow the inspector to view the reference material. For example, the screens may identify reference material associated with the inspection area with a visual/audible indicator and/or actuatable modality, e.g., an icon, a menu selection, a toggle button, etc. By selecting the visual indicator, the inspector can review the reference material before, during, or after performing the portion of the MDI protocol that corresponds with the inspection area.

The software can also comprise one or more instructions to assign and/or associate the reference material with the inspection area discussed above. These instructions may be part of software for executing the MDI protocol or, in one example, as part of a separate software package configured for an end user to develop the screens for use with the MDI technique on the inspection apparatus. The software package may operate on a computing device (e.g., a computer) with a display on which the software provides an interface (e.g., a graphical user interface). The interface may arrange screens of various configurations on the screen that provide tools, menus, and other implements to allow the end user to develop the MDI protocol that is, thereafter, executed on the inspection apparatus. As discussed more below, part of the development process may include assigning and/or associating the reference material, in whole or in part, to the inspection area.

FIG. 1 depicts an exemplary configuration of a inspection apparatus 100 (also an "apparatus 100") the inspector can use to inspect an asset. The apparatus 100 can have a processor, memory, and executable instruction that are stored on the memory or available to be executed by the processor (e.g., downloadable from a cloud-based network). These executable instructions can make up all or a portion of the software and software packages discussed herein. The apparatus 100 has a housing 102 that couples to a remote inspection module 104 with a camera 106 on an end that the inspector directs into generally difficult to access/view regions and components of the asset. The camera 106 can capture digital images and video of the inspection areas. The housing 102 can include a display 108, a data entry device 110, and an actuator 112 through which the inspector can interact with the display 108, e.g., to operate software and execute the MDI protocol. The data entry device 110 can comprise various buttons the inspector can actuate, e.g., by depressing and/or voice instructions, in order to issue commands, e.g., to capture images with the camera 106 and enter data into the apparatus 100. The actuator 112 can include a joystick, thumbwheel, and/or other device (e.g., a microphone for voice commands) the inspector can manipulate to interact with the software on the apparatus 100 through the various screens that direct the inspection and, more particularly, permit access to the reference material stored as part of the inspection procedure.

Also shown in FIG. 1 is a computing device 114 and an external server 116, which can communicate with one another via a network 118. The apparatus 100 can communicate with the computing device 114 and the external server 116 using a wired connection (e.g., a USB cable), a wireless connection (e.g., 802.11), and/or using one or more transitory mediums (e.g., a flash drive) that couples with the apparatus 100 and the computing device 114. In one example, the computing device 114 executes (and/or permits access to) executable instruction and/or software to build an inspection procedure in accordance with the MDI protocol. The computing device 114 can store the software locally or, in one example, the computing device 114 retrieves one or more of the executable instructions from the external server 116. Moreover, the present disclosure contemplates that the apparatus 100 can access the software to build the inspection procedure using the display 108, the data entry device 110, and the actuator 112.

In addition to selecting and arranging the inspection areas, execution of the software on the computing device 114 permits association and selection of the reference material with the inspection areas. In one example, the end user can save the inspection procedure that results as one or more data files including an inspection procedure file necessary to execute the inspection procedure on the apparatus 100 and one or more reference files representative of the reference material. The reference files can include various types (e.g., .pdf, .jpg, .bmp) that depend on the characteristics of the reference material (e.g., text, images, etc.). In one example, hyperlinks and/or other dynamic links can be used to direct the end user to the reference file. The inspection procedure file and the reference file can be transferred to the apparatus 100 via the transitory medium or other modality which can convey electronic data files including wired and wireless communication protocols.

Collectively, the apparatus 100, the computing device 114, and the software/executable instructions can form an inspection system 118 that allows the end user to implement any variety of MDI protocols. Changes to the availability of certain reference material may, for example, necessitate that the MDI protocol is updated to include and/or change the assignment of certain reference material to inspection areas on the asset. Examples of the inspection system 118 permit modifications to the inspection procedure files and reference files, wherein any changes can be uploaded or otherwise transferred to the apparatus 100 to make such changes available to the inspector.

Figure 2:
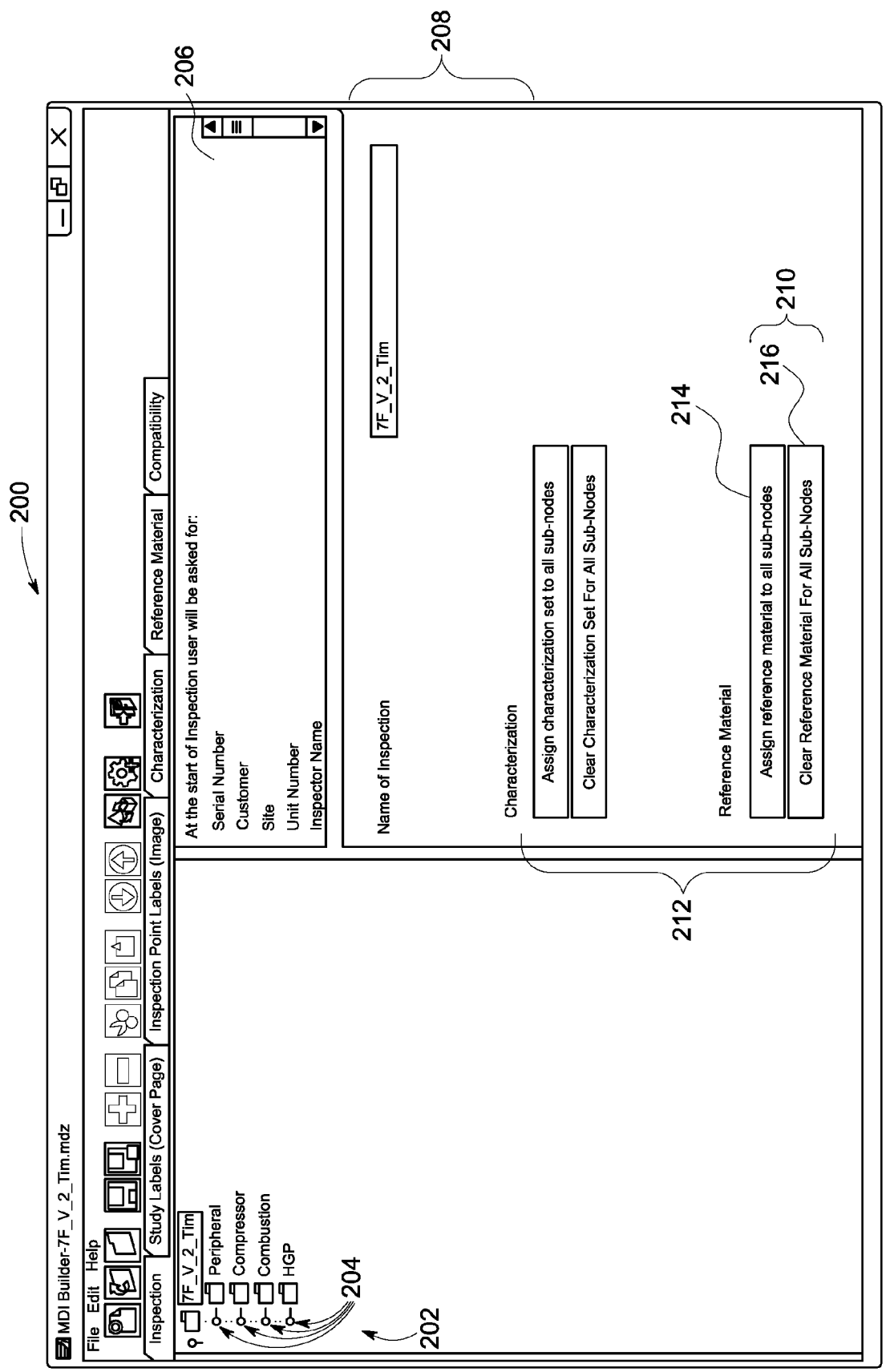
FIG. 2 depicts a screen shot of an exemplary interface for implementing a menu directed inspection protocol in the inspection system of FIG. 1.

FIG. 2 depicts a screen shot of an exemplary interface 200 for implementing an MDI protocol using an inspection system (e.g., inspection system 118 of FIG. 1). The interface can result from execution of the software and executable instructions, which can be stored in memory and configured to be executed by one or more processors. These executable instructions can, in one example, be configured so execution by the processor will generate the interface on the display of a computing device (e.g., computing device 114 of FIG. 1) and a inspection apparatus (e.g., inspection apparatus 100 of FIG. 1). Variations in the configuration of the interface and the display may occur in response to selections and inputs the end user provides, e.g., by pointing and clicking on icons or menus with a mouse, stylus, and/or finger, or by using voice instructions.

In one embodiment, the interface 200 includes an inspection tree 202 with one or more inspection points 204 that correspond to areas on the asset that are to be inspected. Generally the inspection tree 202 identifies components in the asset or, in one example, a portion of the asset that is to be inspected. Examples of the inspection points 204 can include pumps, blades, compressors, and like components that would be found as part of the assembly that inspection tree 202 represents. Additional inspection points 204 can also be included in the inspection tree 202 that further identify with specificity the inspection areas. For example, while one inspection point 204 may identify a turbine, a further inspection point tied to the turbine in the inspection tree 202 may identify a specific turbine blade and a yet further inspection point tied to the turbine blade may identify a specific area on the turbine blade.

The interface 200 also includes one or more assignment components (e.g., inspection assignment component 206, inspection point assignment component 208, and reference material assignment component 210). The assignment components permit the end user to define characteristics of the inspection tree 202 and the inspection points 204. These characteristics can help to direct the inspector through the inspection procedure as well as to identify and define the information that the inspector collects during the inspection procedure. Each of the assignment components can include selectable fields 212, which the end user can use to navigate to other screens that are part of the interface 200. These other screens may be arranged to receive information about the asset and/or component that is the subject of the inspection.

In one example, the selectable field 212 in the reference material assignment component 210 can include a material assignment field 214 and a material removing field 216. Use of the material removing field 216 can delete association of reference material with one or more of the inspection points 204. The material assignment field 214 is useful to assign reference materials to the inspection tree 202 and, more particularly, to associate reference materials that are pertinent to one or more of the inspection points 204.

Figure 3:
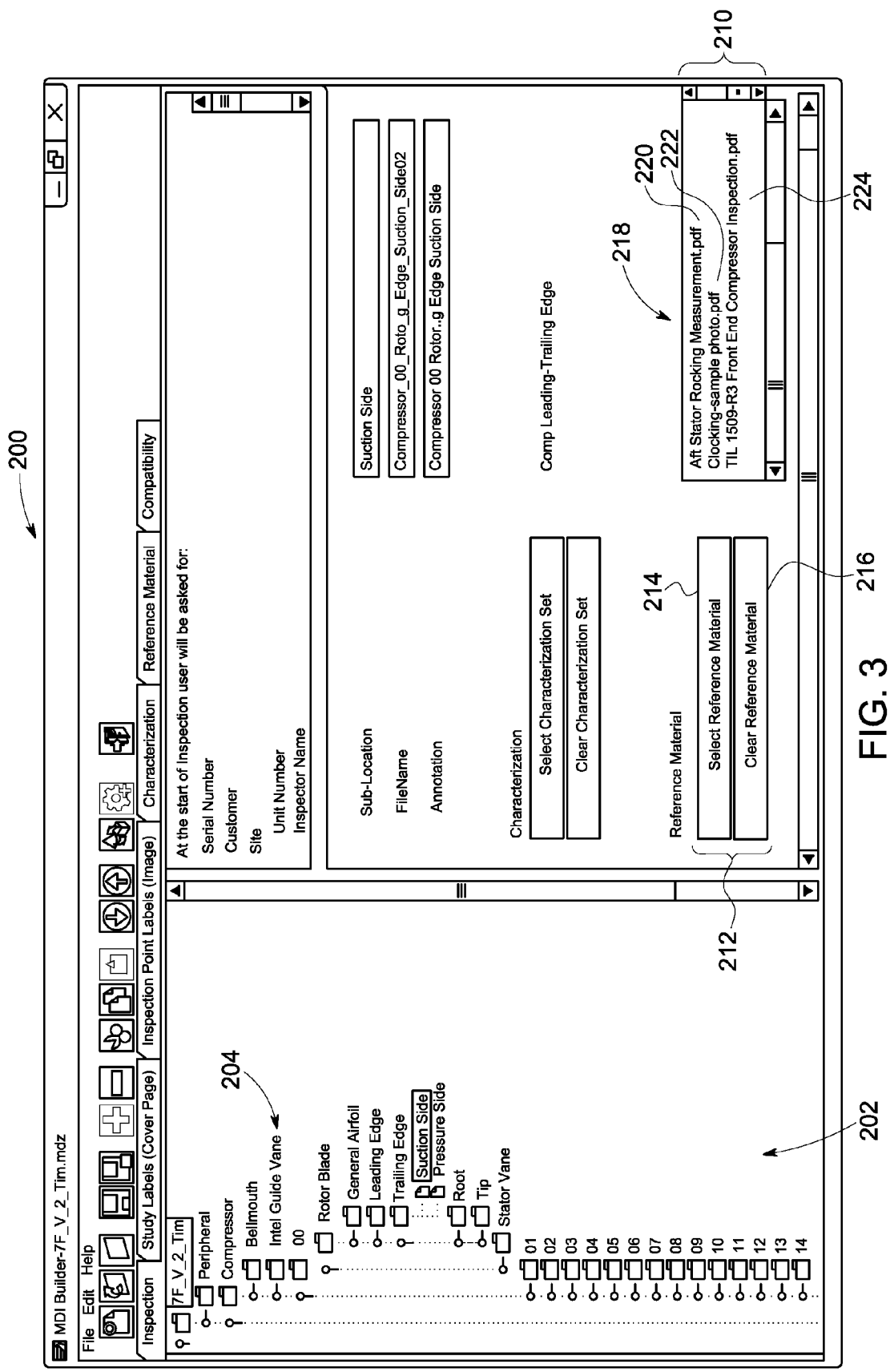
FIG. 3 depicts a screen shot of another exemplary interface for implementing a menu directed inspection protocol in the inspection system of FIG. 1.

FIG. 3 illustrates a screen shot of the interface 200 that can result when the end user selects to use the material assignment field 214. In the example of FIG. 3, the reference material assignment component 210 further includes a reference material identification area 218 with a listing of reference materials (e.g., a first reference 220, a second reference 222, and a third reference 224). The reference materials are generally shown as a listing of files (e.g., by name or by dynamic link) but can also include variations in which the files are shown as an icon or with other identifying labeling. In one example, an end user can populate the reference material identification area 218, e.g., by dragging and dropping files from a file folder or other repository into the reference material identification area 218. Other modalities for populating the references can also include the use of additional icons, buttons, windowing interfaces, and file tree structure, which artisans skilled in the relevant computer arts will recognize as useful for file management in various operating system environments (e.g., Microsoft Windows®).

Figure 4:
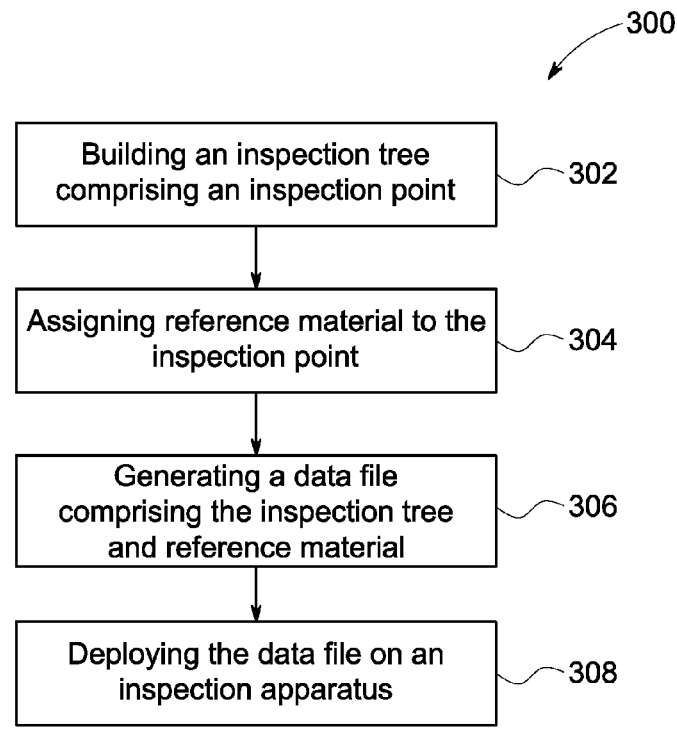
FIG. 4 depicts a flow diagram of an exemplary method for implementing a menu directed inspection protocol.

FIG. 4 illustrates a flow diagram of an exemplary method 300 for implementing an MDI protocol using an inspection system (e.g., inspection system 118 of FIG. 1). The method 300 includes, at step 302, building an inspection tree comprising an inspection point on the asset and, at step 304, assigning the reference material to the inspection point. The method 300 also includes, at step 306, generating the data file comprising the inspection tree and the reference material and, at step 308, deploying the data file on the inspection apparatus that the inspector uses to inspect the asset.

The step for building the inspection tree can occur on a computing device as well as on the inspection apparatus. The inspection tree can have a plurality of the inspection points, which are areas of the asset the inspector is to direct the probe (e.g., the camera) of the inspection apparatus. The inspection points may be listed in various orders including, for example, in an order that allows the inspector to complete the inspection procedure in a timely fashion. Proximity of the areas, for example, may be an important factor when determining the sequence of inspection points in the listing.

In one embodiment, the step for assigning the reference material includes steps for assigning both the entire contents of the reference material as well as for assigning only partial contents of the reference material. For example, the end user may determine that only a portion of the reference material (e.g., one or more pages, chapters, images, etc.) are relevant to the inspection point to which the reference material is to be assigned. The relevant portion can be selected and assigned to the inspection point during execution of the method 300. The step for assigning may also include the entire contents of the reference material, wherein the contents may include a technical specification for a particular part and/or assembly that forms the area of the asset the inspection point identifies. In one embodiment, the content of the reference material may pertain to the asset itself, e.g., an operation manual with figures and diagrams that are useful to describe the working parts of the asset. In this case, the step for assigning may include a step for assigning the technical manual to both the inspection tree in general as well as a step for assigning specific sections of the technical manual with information that corresponds with particularity to the inspection points in the inspection tree.

The step for generating the data files may, in one embodiment, include both the inspection tree and the associated reference material. These items may be stored in a zip file or other compressed format, which can be more easily transferred both via the transitory medium and over wired and wireless communication protocols to and from the components of the inspection system. As discussed above, the data files may include the inspection procedure file that contains information (including, in one example, executable instructions) that the inspection apparatus presents to the end user on the display. The data file can also include a reference file, which contains the content of the reference material. In one example, the data file may contain the entire contents of each of the reference material. In another example, the data file may contain only the portion of the contents that is assigned to the inspections points of the inspection tree. In still another example, the data file may contain an indication of the location of the reference material. The inspection apparatus can, in response to this indication, locate the reference material, which may be stored and/or located at a remote site (e.g., an external server or repository) from which the inspection apparatus can retrieve the information, e.g., by wirelessly downloading the data.

This disclosure contemplates any number of ways to execute the step for deploying the data file on the inspection apparatus. As discussed above, the data files can be transferred via the transitory medium in the compressed data format. The interface between the inspection apparatus and the transitory medium can permit the inspector to access the data files, e.g., by actuating one or more icons or buttons on the inspection apparatus. In other embodiments, the step for deploying may include one or more steps for uploading and/or downloading the data files through wired and wireless connection within the inspection systems. These steps may be included as part of updates to the software and firmware on the inspection apparatus.

Figure 5:
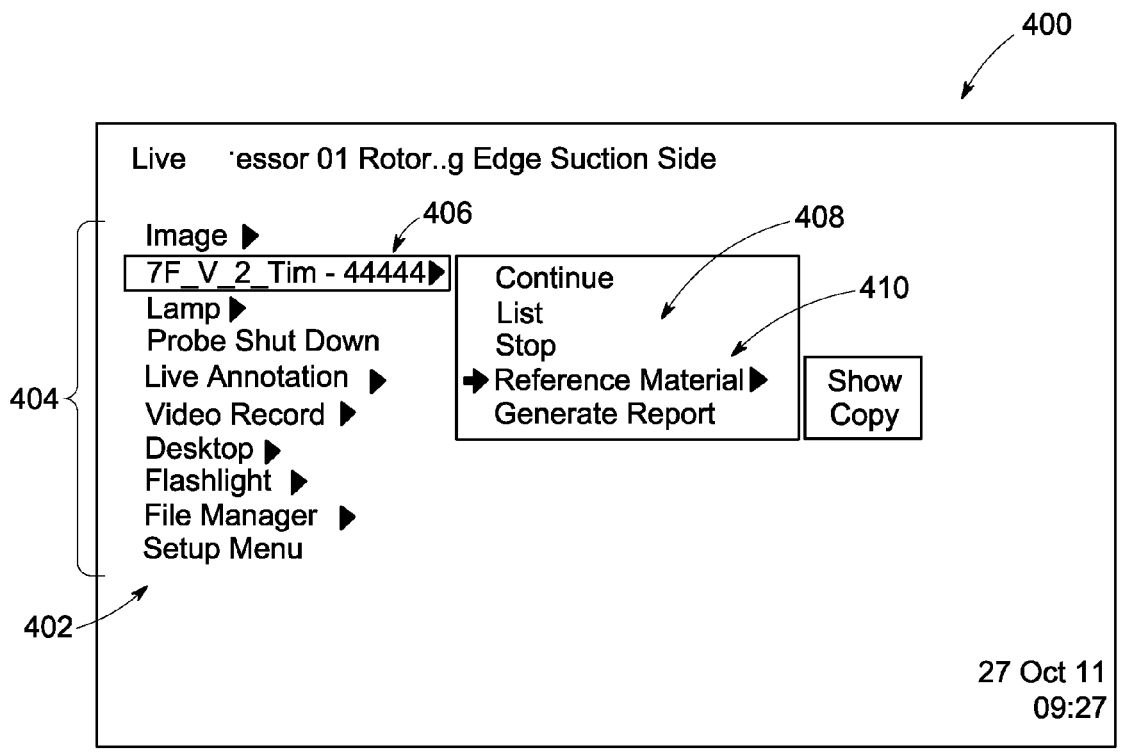
FIG. 5 depicts a screen shot of an exemplary interface in a first configuration on an inspection apparatus.
Figure 6:
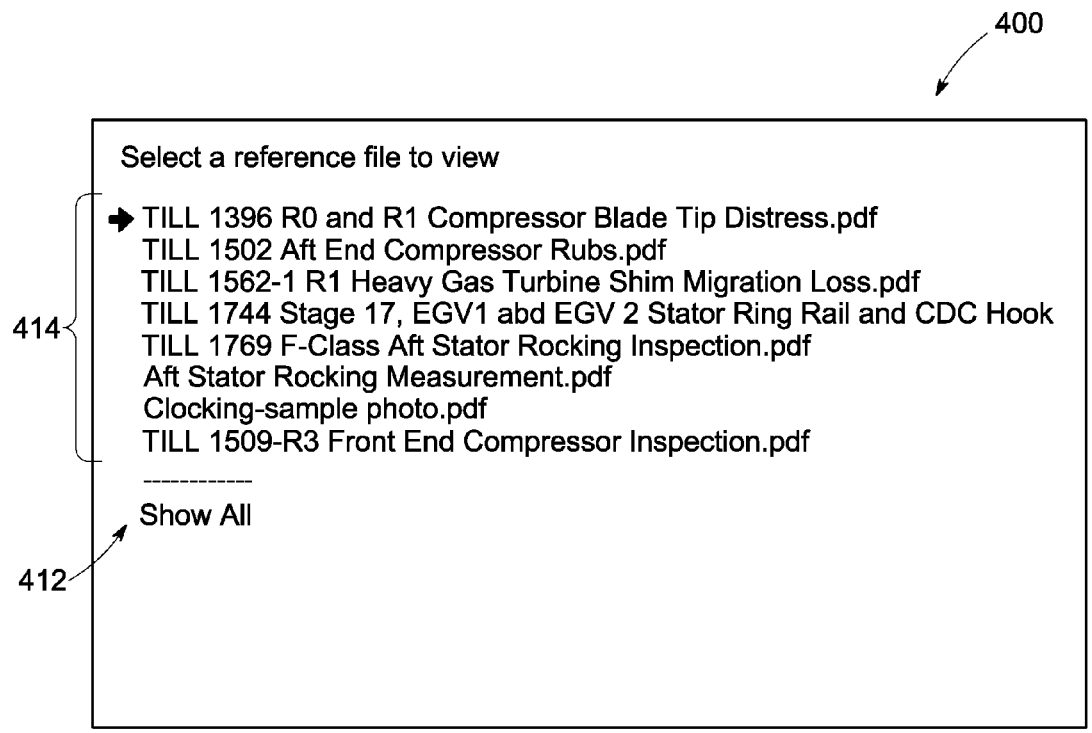
FIG. 6 depicts a screen shot of the exemplary interface in a second configuration on the inspection apparatus.
Figure 7:
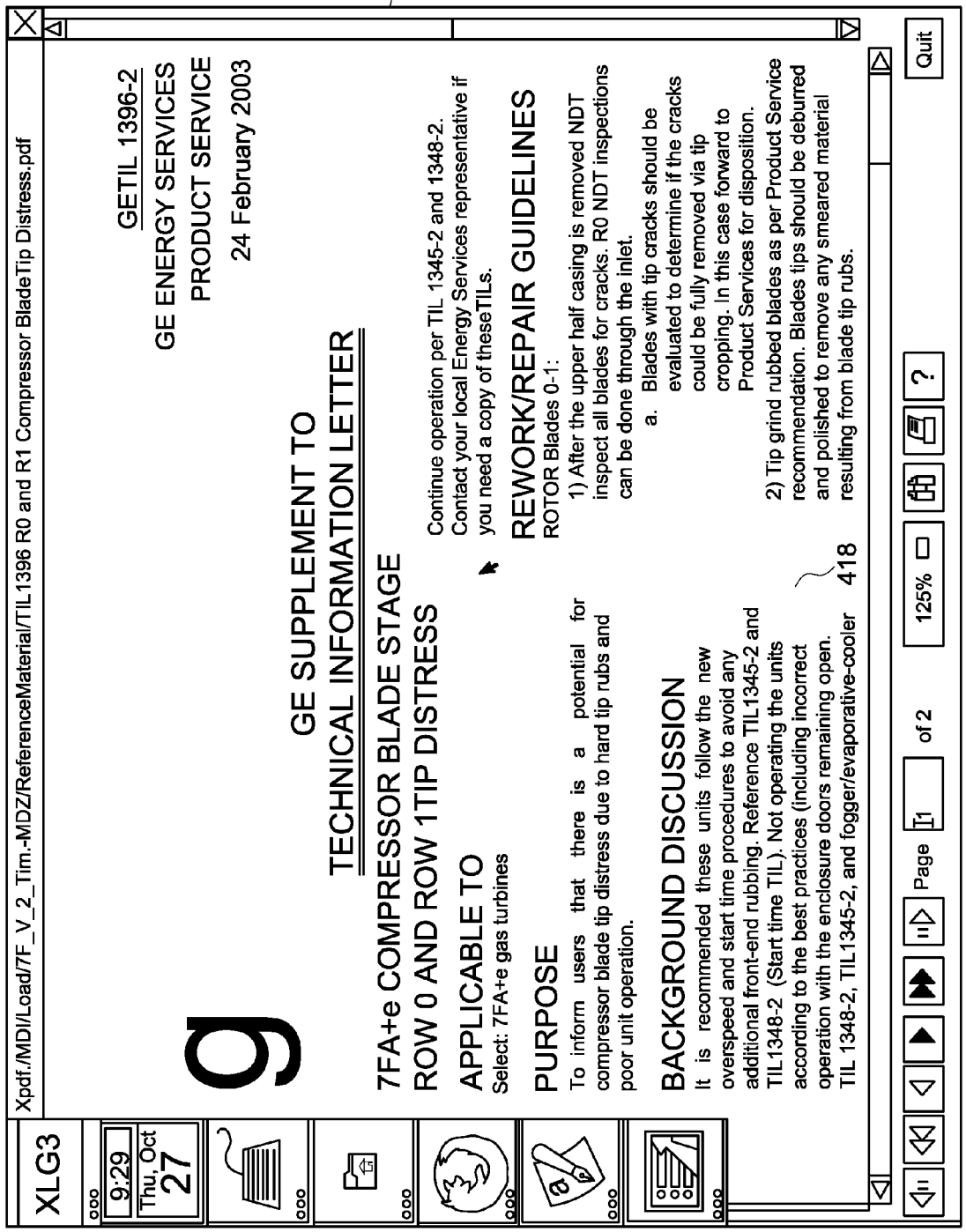
FIG. 7 depicts a screen shot of the exemplary interface in a third configuration on the inspection apparatus.

FIGS. 5, 6, and 7 depict an exemplary interface 400 that can result from implementation of the data files on an inspection apparatus (e.g., inspection apparatus 100 of FIG. 1). Examples of the interface 400 may appear on a display that is part of an inspection apparatus. In addition to the interface 400, one or more embodiments of the inspections systems may permit concurrent operation of a live feed interface (not shown) showing the images and data from the remote inspection module. The software will, in one example, permit toggling between the live feed interface and the interface 400. This features permits the inspector to cross-reference and review the reference material and maintain view of the inspection area.

FIG. 5 shows the interface 400 in a first configuration with a menu 402 that the inspector can navigate to select among a number of working features 404 that can navigate the inspector to other configurations of the interface 400. The working features 404 include a file reference 406, which in one example is representative of the data files (e.g., the inspection protocol files and/or the reference files) that are transferred to the inspection apparatus. Selection of the file reference 406 can activate one or more file options 408 that can implement the MDI protocol associated with the data file. In one example, the file options 408 can include a reference file option 410 that the inventor can select to access the reference materials that are associated with the various inspection points that are part of the MDI protocol.

Generally the inspector can navigate the various working features 404 using the actuator (e.g., joystick, thumbwheel, voice instructions, etc.) to maneuver a cursor about the display. For touch screen displays and other touch-sensitive screens, the inspector may navigate and select amongst the working feature 404 with a finger or stylus. In one embodiment, selection of one of the working features 404 will change the configuration of the interface 400 to allow and/or provide more or less options for the inspector to select from. Although the focus herein is on working features 404 that relate to the reference materials, this disclosure also contemplates examples of the working features 404 that modify various operations of the inspection apparatus, that can modify the steps and functions that occur under the MDI protocol, and that can modify general features of the inspection apparatus (e.g., brightness and sharpness of the display).

FIG. 6 shows the interface 400 in a second configuration that includes a listing 412 with reference materials including a plurality of reference files 414. The reference materials in the listing 412 may reflect all of the information that is assigned to the asset or, in one example, only to information for a specific inspection point. The distinction in the content of the listing 412 may occur in one or more previous configurations (e.g., the first configuration) of the interface 400.

To select one of the reference files 414, the inspector may scroll through the listing 412 with the actuator. A cursor may provide highlighting or other indication as to which of the reference files 414 that inspector navigates onto and can select. In one example, menu selections, arrows, and other icons may be found on or as part of the interface 400 to permit active navigation amongst the reference files 414. These icons may also permit the inspector to navigate to other configurations of the interface 400, e.g., to change to another listing 412.

FIG. 7 illustrates a screen shot of the interface 400 in a third configuration that reflects selection of one or more of the reference files (e.g., reference files 414 of FIG. 5). In FIG. 7, the interface 400 includes a document component 416 that can display a document 418 corresponding to the reference file. Examples of the document component 416 can accommodate the different types of reference files including images, videos, documents, spreadsheets, Web browser pages (e.g., HTML pages), and other document types that are known and used to convey information.

In view of the foregoing, embodiments of the systems and methods associate reference material to inspection areas for viewing by an inspector that is performing an inspection. A technical effect is to improve the inspection process by providing access to relevant information in the form of, in one example, reference material that correspond to the asset and/or the inspection area. These embodiments also permit access to the information through a single access point, e.g., the inspection apparatus the inspector employs to perform the inspection, thereby allowing the inspector to continue inspecting while still reviewing the reference material.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An inspection system, comprising
    an inspection apparatus comprising a display, a processor, memory coupled to the processor, and one or more executable instructions stored on the memory and configured to be executed by the processor to generate an interface on the display, the executable instructions including instructions for,
        displaying the interface in a first configuration having a menu from which a data file can be selected;
        displaying the interface in a second configuration in response to selection of the data file, the second configuration having a listing of reference files assigned to one or more inspection points of a menu directed inspection protocol; and
        displaying the interface in a third configuration in response to selection of a reference file, the third configuration including a document component on which information corresponding to the reference file is displayed,
    wherein the inspection apparatus comprises a video borescope.

2. The inspection system of claim 1, further comprising instructions for operating a live feed interface that is configured to show images and data on the display that corresponds to information from a remote inspection module.

3. The inspection system of claim 2, wherein the remote inspection module comprises a camera.

4. The inspection system of claim 2, wherein the interface operates concurrently with the live feed interface.

5. The inspection system of claim 1, further comprising instructions for reading a transitory medium having a data file that instructions one or more configurations for the interface.

6. The inspection system of claim 5, wherein the transitory medium comprises the reference material.

7. The inspection system of claim 1, further comprising instructions for retrieving the reference files from a remote device.

8. The inspection system of claim 7, wherein the inspection apparatus comprises a wireless device to communicate with the remote device to retrieve the reference files therefrom.

9. The inspection system of claim 1, wherein the reference file comprises a portion of a document, and wherein the portion is selected and assigned to the inspection point.

10. A method for executing a menu directed inspection of an asset, said method comprising steps for:
    building an inspection tree comprising an inspection point corresponding to a location on the asset;
    assigning reference material to the inspection point;
    generating a data file comprising the inspection tree and the reference material; and
    deploying the data file on a video borescope that an inspector uses to perform the inspection of the asset, wherein the data file further defines an inspection protocol that provides a screen to direct the inspector to position the video borescope at the location on the asset to capture an image.

11. The method of claim 10, further comprising a step for selecting a portion of the reference material, wherein the step for assigning only assigns the selected portion.

12. The method of claim 10, wherein the data file comprises a reference file containing the reference material.

13. The method of claim 10, wherein the data file comprises an indication of the location of the reference material, wherein the inspection apparatus uses the indication to retrieve the reference material.

14. The method of claim 10, wherein the reference material contains information that relates to the location on the asset at which the image is captured.

15. An inspection apparatus, comprising:
a housing;
a display that integrates into the housing; and
a remote inspection module coupled with the housing,
wherein the remote inspection module is configured to capture images at a location on an asset;
wherein the housing encloses a processor and memory coupled to the processor, and
wherein one or more executable instructions are stored in the memory and configured to be executed by the processor to generate an interface on the display, the executable instructions including instructions for changing the interface between a variety of configurations including,
a first configuration having a menu from which a data file can be selected,
a second configuration in response to selection of the data file, the second configuration having a listing of reference files assigned to one or more inspection points of a menu directed inspection protocol, and
a third configuration in response to selection of a reference file, the third configuration including a document component on which information corresponding to the reference file is displayed,
wherein the executable instructions include instructions to configure the interface to direct the inspector to position the remote inspection module at the location on the asset to capture the image.

16. The inspection apparatus of claim 15, further comprising a port to receive a transitory medium, wherein the reference file is stored in the transitory medium.

17. The inspection apparatus of claim 15, wherein the executable instruction include instructions for collecting data from the remote inspection module and for displaying the data via the interface.

18. The inspection apparatus of claim 17, wherein the remote inspection module comprises a camera.

19. The inspection apparatus of claim 15, further comprising instructions for operating a live feed interface that is configured to show images and data on the display that corresponds to information from the remote inspection module.

20. The inspection apparatus of 15, wherein the reference material contains information that relates to the location on the asset at which the image is captured.

* * * * *